United States Patent
Swoboda et al.

[11] Patent Number: 5,902,672
[45] Date of Patent: May 11, 1999

[54] FABRIC FOR AIRBAG

[75] Inventors: Peter Swoboda, Grossaitingen; Peter Krix, Bobingen, both of Germany

[73] Assignee: Hoechst Trevira GmbH & Co. KG, Germany

[21] Appl. No.: 07/868,037

[22] Filed: Apr. 13, 1992

[30] Foreign Application Priority Data

Apr. 15, 1991 [DE] Germany .............................. 41 12 229

[51] Int. Cl.$^6$ ...................................................... B52B 7/08
[52] U.S. Cl. .......................... 428/258; 428/225; 428/227; 428/257; 428/259; 139/383 R; 280/728; 280/732; 280/739; 280/742
[58] Field of Search ................................. 428/35.1, 35.2, 428/35.4, 36.1, 225, 257, 258, 259; 139/383 R; 280/728, 738, 739, 743, 742

[56] References Cited

U.S. PATENT DOCUMENTS

| | | | |
|---|---|---|---|
| 3,937,488 | 2/1976 | Wilson et al. | 101/110 |
| 4,054,709 | 10/1977 | Belitsin et al. | 428/224 |
| 4,892,557 | 1/1990 | Conklin et al. | 8/497 |
| 4,921,735 | 5/1990 | Bloch | 428/34.9 |
| 5,010,663 | 4/1991 | Thornton et al. | 38/52 |
| 5,093,163 | 3/1992 | Krummheuer et al. | 280/743 |
| 5,098,125 | 3/1992 | Thornton et al. | 280/743 |
| 5,131,434 | 7/1992 | Krummheuer et al. | 139/383 R |

FOREIGN PATENT DOCUMENTS

| | | |
|---|---|---|
| 0 314 867 | 5/1989 | European Pat. Off. . |
| 2 317 991 | 10/1973 | Germany . |
| 4 004 216 | 8/1991 | Germany . |
| 1 378 390 | 12/1974 | United Kingdom . |
| 1 422 447 | 1/1976 | United Kingdom . |
| WO 90/09295 | 8/1990 | WIPO . |

*Primary Examiner*—José G. Dees
*Assistant Examiner*—Michael A. Williamson

[57] ABSTRACT

There is described a synthetic yarn fabric for the gas-releasing part of an airbag. The synthetic yarn is a synthetic high-tenacity multifilament yarn having a filament linear density of less than 4 dtex and a yarn count within the range from 250 to 550 dtex. The fabric itself is in a crepe or modified huckaback weave. In contradistinction to the conventional polyamide fabrics, it is uncoated and is preferably woven from unsized yarns. The fabric need not be calendered. It has been found that this fabric of fine-filament, high-tenacity polyester yarn, although uncoated, does meet the airbag fabric requirements such as readily preselectable air permeability, low fabric weight and low fabric thickness and also high fabric strength.

10 Claims, No Drawings

FABRIC FOR AIRBAG

The invention relates to a synthetic yarn fabric for an airbag, specifically a front seat passenger airbag, as increasingly used as a safety device in motor vehicles. An airbag has the function, in the event of danger, of being inflatable by very rapidly incoming gas into a balloon which, owing to the high pressure prevailing therein, is capable of absorbing the impact of a body effectively yet softly. This presupposes that the high pressure in the airbag is retained until the vehicle and hence the body to be cushioned has come to a stop. Then, however, the protective balloon should collapse as rapidly as possible so as not to hinder further actions on the part of the protected person.

An airbag therefore has very precise requirements in terms of the increase and decrease in pressure with time, which are achievable by fitting preset outlet valves in an otherwise gas-impermeable sleeve of the airbag or by making part of its sleeve, the jacket, gastight while the side parts are left with a planned level of gas permeability.

As follows from the above-described requirements for an airbag, it is of crucial importance that the gas-releasing part of such an airbag should combine certain properties, namely a suitable gas permeability, a low fabric weight and a low fabric thickness (to save space in the motor vehicle) and a high fabric breaking strength and breaking extension (to absorb the energy in the explosive unfolding of the airbag).

An airbag having gas-releasing side parts of planned gas permeability is described in German Patent Application P 40 04 216.2.

The airbag described therein substantially avoids the disadvantages of prior art airbags, in particular those having coated (rubberized) or aftershrunk and calendered fabrics as known for example from DE-A-2 317 991 and EP 314 867 respectively.

It is an object of the present invention to provide a coating-free synthetic yarn airbag fabric which is particularly simple to manufacture and yet fully meets the airbag material requirements, such as suitable gas permeability, low fabric weight, low fabric thickness and also high fabric strength and high fabric extensibility.

This object is achieved by the invention defined in claim 1.

The required elevated gas permeability will be simple to achieve with a low yarn density, but only at the cost of fabric strength and yarn slippage resistance.

It has now been found, surprisingly, that fabrics in a crepe weave or in a modified huckaback weave are particularly advantageous for the gas-releasing part of the airbag.

Fabrics with a crepe weave are known. Their characteristic feature is a random distribution of the crossing points over the entire weave repeat, although in general there is an approximately equal disposition of warp and weft on the surface of the cloth and long floats are avoided (cf. for example "Bindungslehre für Kleiderstoff-und Tuchweber", Volk und Wissen Volkseigener Verlag Berlin 1955; "Koch-Satlow, Grosses Textillexikon", Deutsche Verlagsanstalt Stuttgart 1965).

A preferred crepe weave for the purposes of the present invention has a basic weave repeat turned over in each case by 90°. Particular preference is given to basic repeat sizes of 6 threads in warp and weft, so that turning the basic weave repeat over four times by 90° each time produces a repeat pattern of 12 threads in each direction.

The floating of the threads brings about the planned degree of gas permeability of the fabric despite its high density and consequently high strength.

Preference is given to floats extending over three warp and/or weft threads.

The crepe fabric to be used according to the present invention exhibits not only the application parameters required by the automotive industry as regards gas permeability, strength, extensibility, tongue tear resistance, basis weight and thickness but also a high yarn slippage resistance and considerable diagonal extensibility.

Huckaback weaves are likewise known to the person skilled in the art.

It is true that fabrics with a normal huckaback weave, which in general have relatively long warp and weft yarn floats and warp on one side and weft on the other, have been found to be not very suitable for use as gas-releasing airbag fabrics.

Surprisingly, however, a fabric with (a modified huckaback weave in which every warp and weft repeat yarn follows substantially the same method of interlacing, i.e. where the warp-weft crossings have ideally the same number of warp-weft crossing points), is highly suitable for use as gas-releasing fabric in airbags.

The modified huckaback weave fabric scores well on flatness and likewise possesses the required application parameters as regards fabric strength, fabric extensibility, tongue tear resistance, basis weight and fabric thickness and a high yarn slippage resistance.

Again, the gas permeability value is specifically controllable by varying the modified huckaback construction.

As has been found, surprisingly, the use of these types of weaves, in particular in conjunction with the use of a, preferably high-tenacity, synthetic multi-filament yarn having fine filaments of 4 dtex or less and a yarn count within the range from 250 to 550 dtex, makes it possible, without special fabric aftertreatment such as shrinking, heat setting or calendering, to produce an airbag fabric which without coating and rubberization has the required properties, in particular a particularly conveniently adjustable air permeability. The fabric formed according to the present invention is thus notable for its particularly simple and economical manufacture. Owing to the absence of rubberization, there is no danger of embrittlement, and this has a correspondingly favorable effect on airbag life.

The filament linear density of the yarn can be for example 4.0 dtex and is preferably even less than 3.2 dtex.

The yarn count is preferably within the range from 280 to 450 dtex, in particular within the range from 315 to 400 dtex.

Preferably, the yarn used according to the present invention is a polyester yarn having a tenacity of more than 60 cN/tex, in particular of more than 65 cN/tex, and a breaking extension of more than 15%, in particular of more than 20%.

A particularly good choice for manufacturing the fabric according to the present invention are for example the commercial polyester yarns (R)TREVIRA HOCHFEST from Hoechst AG.

The particularly advantageous gas permeability characteristics of the fabric constructed according to the present invention are probably in particular due to the interaction of the types of weave described with the use of fine-filament warp and weft yarns. The fine filament linear density leads to a low fabric weight and to a low fabric thickness.

The basis weight of the fabric is preferably less than 220 g/m$^2$, in particular less than 190 g/m$^2$, for example 177 g/m$^2$, while the fabric thickness is preferably less than 0.35 mm, particularly preferably less than 0.30 mm, in particular less than 0.26 mm.

The breaking strength of the fabric is preferably more than 220 daN and the breaking extension of the fabric is more than 22%, preferably more than 25%, each figure being based on a 5 cm wide fabric strip. These strength and extension values ensure that the fabric is suitable for absorbing the energy of the explosive expansion of the airbag.

To obtain good mechanical properties, the fabric should be woven to the tightest possible set compatible with the chosen yarn count and the chosen fabric construction; that is, the fabric should be woven with the maximum possible number of threads per unit length warpways and weftways, for example in the case of a 315 dtex polyester yarn advantageously with from 23 to 30 threads/cm, for example 28 threads/cm, in warp and weft.

If the yarn count is lower, a correspondingly higher number of threads/cm is used, while if the yarn count is higher a correspondingly lower number of threads/cm is used.

Surprisingly, the crepe or modified huckaback weave used according to the present invention led for the same thread density to a distinctly higher gas permeability than the known plain or cross twill weave. This means that despite the higher gas permeability required it is possible to obtain good mechanical properties, for example a high breaking strength, very favorable extensibility, a high tongue tear resistance and a high yarn slippage resistance.

Moreover, it is technically advantageous that the same warp beams can be used for manufacturing fabrics for the gastight and the gas-releasing part of the airbag.

In a further preferred refinement of the invention, the fabric consists of twisted warp yarns and untwisted weft yarns. The yarn twist is preferably within the range from 110 to 130 turns/m, in particular about 120 turns/m. It is advantageous to use an unsized polyester yarn having a hot air shrinkage at 200° C. of less than 9%.

As mentioned earlier, the fabric constructed according to the present invention requires no warp sizing, washing, heat setting, calendering or coating.

The present invention also provides an airbag, in particular an airbag with a gastight and a gas-releasing fabric part, in particular for protection of the front seat passenger, made essentially of the above-described uncoated and unrubberized and preferably also unsized and uncalendered woven fabrics.

In a preferred embodiment of the airbag of the present invention, the gastight fabric part is a fabric woven to a set of maximum tightness, in particular in a rip stop weave, preferably with a multiple, in particular a double, yarn every 3–8 mm warpways and weftways. It is particularly advantageous to have a spacing of about 4.5 to 5.5 mm between the multiple/double yarns. The gas-releasing fabric part is made as mentioned earlier of a fabric in a crepe or modified huckaback weave.

Particularly preferred embodiments of the fabric and airbag according to the present invention are those which combine a plurality of the abovementioned preferred features.

The fabric of the present invention is manufactured by conventional weaving processes, specifically by weaving a synthetic multifilament yarn having a filament linear density of 4 dtex or less and a yarn count within the range from 250 to 550 dtex into the above-described crepe or modified huckaback weave.

Preferably, the yarn used is a polyester yarn having a tenacity of more than 60 cN/tex, in particular more than 65 cN/tex, and a breaking extension of more than 15%, preferably of more than 20%.

It is also advantageous to use an unsized polyester yarn which has a hot air shrinkage at 200° C. of less than 9%.

In particular, a fabric for the gas-releasing part is woven from a twisted warp yarn and an untwisted weft yarn.

It has further been found to be advantageous to use a 1/1 plain weave but preferably a rip stop weave for the gas-tight material and the above-described weaves, namely a crepe weave or a modified huckaback weave, for the gas-releasing material.

The manufacture of an airbag according to the present invention having a gastight and a gas-releasing fabric part is effected by joining together suitably trimmed lengths of fabric in a conventional manner and comprises using for the gastight fabric part a woven fabric, for example in a plain or rip stop weave, with a set of maximum tightness, and for the gas-releasing fabric part the fabric as claimed in claim 1 in a crepe or modified huckaback weave.

The manufacture of further, particularly preferred embodiments of the airbag according to the present invention may be effected by using above-described fabrics which combine preferred properties, for example by using a gastight jacket fabric in a rip stop weave and a gas-releasing fabric in a crepe or modified huckaback weave.

EXAMPLE

An uncoated woven fabric for a front seat passenger airbag was produced using a 315 dtex 100 filament TREVIRA HOCHFEST high-tenacity polyester filament yarn.

A) The fabric construction chosen for the gas-impermeable middle part (jacket) of the airbag was a rip stop weave. The fabric set was 28 threads/cm in both warp and weft.

The loomstate fabric had the following data:

| | |
|---|---|
| Warp yarn | 315 dtex 100 filaments 120 turns/m |
| Weft yarn | 315 dtex 100 filaments zero twist |
| Weave | rip stop |
| Set [threads/cm] | 28/28 |
| Basis weight | 197 g/m$^2$ |
| Fabric thickness | 0.30 mm |
| Breaking strength | 273 daN (warp) |
| (measured on a 5 cm wide strip) | 285 daN (weft) |
| Breaking extension | 32% (warp) |
| (measured on a 5 cm wide strip) | 29% (weft) |
| Tongue tear resistance | 14 daN (warp) |
| to DIN 53356, evaluation to DIN 53539B | 14 daN (weft) |
| Air permeability | 2.7 1 dm$^{-2}$ min$^{-1}$ under a hydrostatic head of 50 mm |

This fabric, made from unsized polyester yarn, was produced without finishing and without calendering and without any coating whatsoever and used in the gastight part of an airbag.

B) The gas-releasing part of the airbag was made of a fabric of the following construction:

| | |
|---|---|
| Warp yarn | 315 dtex 100 filaments 120 turns/m |
| Weft yarn | 315 dtex 100 filaments zero twist |
| Weave | crepe |
| Set [threads/cm] | 28/26 |

The loomstate fabric for the gas-releasing part of the airbag had the following data:

| | |
|---|---|
| Basis weight | 182 g/m² |
| Fabric thickness | 0.29 mm |
| Breaking strength | 275 daN (warp) |
| (5 cm wide fabric strip) | 246 daN (weft) |
| Breaking extension | 24% (warp) |
| (5 cm wide fabric strip) | 22% (weft) |
| Tongue tear resistance | 18 daN (warp) |
| to DIN 53356, evaluation | 18 daN (weft) |
| to DIN 53539B | |
| Air permeability | 62 1 dm⁻² min⁻¹ under a hydrostatic head of 50 mm |

As can be seen, the fabric for the gas-releasing part of the airbag was woven not in a rip stop weave but in a crepe weave of almost the same thread density. This resulted in an increase in the air permeability of 2.7 to 62 $l.dm^{-2}.min^{-1}$ *under a hydrostatic head of* 50 mm.

A similar, surprisingly good result is obtained on using in the gas-releasing side part a fabric having the following data:

| | |
|---|---|
| Warp yarn | 315 dtex 100 filaments 120 turns/m |
| Weft yarn | 315 dtex 100 filaments zero twist |
| Weave | modified huckaback weave |
| Set [threads/cm] | 28/26 |

The loomstate fabric for the gas-releasing airbag part had the following data:

| | |
|---|---|
| Basis weight | 181 g/m² |
| Fabric thickness | 0.30 mm |
| Breaking strength | 273 daN (warp) |
| (5 cm wide fabric strip) | 244 daN (weft) |
| Breaking extension | 25% (warp) |
| (5 cm wide fabric strip) | 23% (weft) |
| Tongue tear resistance | 19 daN (warp) |
| to DIN 53356, evaluation | 19 daN (weft) |
| to DIN 53539B | |
| Air permeability | 65 1 dm⁻² sec⁻¹ under a hydrostatic head of 50 mm |

What is claimed is:

1. An uncoated gas-permeable fabric having sufficient gas-permeability, flatness, fabric strength, fabric extensibility, and tongue tear resistance for use, without modification, as the gas-releasing part of an airbag, said uncoated gas-permeable fabric comprising: a synthetic multifilament yarn with a tenacity of more than 60 cN/tex having a filament linear density of 4 dtex or less and a yarn count within the range from 250 to 550 dtex in an uncoated, gas-permeable crepe or modified huckaback weave, the gas-permeable, modified huckaback weave having warp-weft crossings with essentially the same number of warp-weft crossing points, said gas-permeable fabric having a thickness not exceeding 0.35 mm.

2. The uncoated gas-permeable fabric of claim 1, wherein said synthetic multifilament yarn is a polyester yarn which has a breaking extension of more than 15%.

3. The uncoated gas-permeable fabric of claim 2, wherein the polyester yarn has a hot air shrinkage at 200° C. of less than 9%.

4. The uncoated gas-permeable fabric of claim 2, wherein the polyester yarn is size-free.

5. The uncoated gas-permeable fabric of claim 1, having a substantially gastight portion, said portion having less gas-permeability than said gas-permeable fabric, even when the yarn count of the gastight portion has the same yarn count as the gas-permeable fabric, said gas-permeable fabric and said gastight portion having twisted warp yarns and untwisted weft yarns.

6. The uncoated gas-permeable fabric with the substantially gastight portion of claim 5, wherein the warp yarn twist is within the range of 110 to 130 turns/m.

7. The uncoated gas-permeable fabric of claim 1, wherein said fabric has a basis weight of less than 220 g/m².

8. The uncoated gas-permeable fabric of claim 1, wherein said fabric has a breaking strength of more than 220 daN and a breaking extension of more than 22%, both measured on a 5 cm-wide fabric strip.

9. An airbag comprising:
a substantially gastight fabric portion, and, integral therewith,
an uncoated, gas-permeable fabric having a crepe or modified huckaback weave, the gas- permeable, modified huckaback weave having warp- weft crossings which have essentially the same number of warp-weft crossing points, said gas-permeable fabric having a thickness not exceeding 0.35 mm.

10. The airbag of claim 9, wherein said uncoated, gas-permeable fabric has a set which is from 10 to 25% lower than that of the substantially gastight fabric portion.

* * * * *